United States Patent
Scholz et al.

(10) Patent No.: US 12,138,611 B2
(45) Date of Patent: Nov. 12, 2024

(54) APPARATUS AND METHOD FOR AUTOMATABLE START-UP OF A STEAM REFORMER ARRANGEMENT INTO A NORMAL OPERATING STATE, AND USE AND OPEN-LOOP CONTROL/CLOSED-LOOP CONTROL DEVICE AND COMPUTER PROGRAM PRODUCT

(71) Applicants: thyssenkrupp Industrial Solutions AG, Essen (DE); thyssenkrupp AG, Essen (DE)

(72) Inventors: Marco Scholz, Dortmund (DE); Ernst Sichtermann, Dortmund (DE); Thorsten Brakhane, Dortmund (DE); Klaus Nölker, Dortmund (DE)

(73) Assignees: thyssenkrupp Uhde GmbH, Dortmund (DE); thyssenkrupp AG, Essen (DE)

( * ) Notice: Subject to any disclaimer, the term of this patent is extended or adjusted under 35 U.S.C. 154(b) by 368 days.

(21) Appl. No.: 17/629,604

(22) PCT Filed: Jul. 8, 2020

(86) PCT No.: PCT/EP2020/069265
§ 371 (c)(1),
(2) Date: Jan. 24, 2022

(87) PCT Pub. No.: WO2021/018535
PCT Pub. Date: Feb. 4, 2021

(65) Prior Publication Data
US 2022/0241747 A1 Aug. 4, 2022

(30) Foreign Application Priority Data
Jul. 26, 2019 (DE) .................... 10 2019 211 177.7

(51) Int. Cl.
*B01J 19/00* (2006.01)
*B01J 19/24* (2006.01)
*C01B 3/34* (2006.01)

(52) U.S. Cl.
CPC ....... *B01J 19/0033* (2013.01); *B01J 19/0013* (2013.01); *B01J 19/2415* (2013.01);
(Continued)

(58) Field of Classification Search
CPC .... B01J 19/00; B01J 19/0006; B01J 19/0033; B01J 19/24; B01J 19/2415; B01J 2219/00;
(Continued)

(56) References Cited

U.S. PATENT DOCUMENTS 2,085,195 A   6/1937  Kerr
3,350,176 A  10/1967  Green et al.
(Continued)

FOREIGN PATENT DOCUMENTS

DE   10 2008 033 096 A1   2/2010
DE   10 2008 046 800 A1   3/2010
(Continued)

OTHER PUBLICATIONS

English Translation of International Search Report issued in PCT/EP2020/069265, dated Sep. 28, 2020.

*Primary Examiner* — Natasha E Young
(74) *Attorney, Agent, or Firm* — thyssenkrupp North America, LLC

(57) ABSTRACT

A method can be utilized to startup into a normal operating state a steam reformer arrangement for the production of hydrogen, methanol, or ammonia. A plurality of burners that are coupled to at least one reactor having reformer tubes may be controlled and regulated. In particular, startup may be performed out and regulated in an automated manner by the (Continued)

burners ensuring normal operation, in particular non-startup burners, being ignited indirectly as a function of temperature by means of burners provided specifically for startup, in particular pilot burners and startup burners, as a function of automatically evaluated flame monitoring at least at the pilot burners. This method provides time savings and savings of outlay in terms of personnel and also high operational reliability.

19 Claims, 3 Drawing Sheets

(52) U.S. Cl.
CPC ....... *C01B 3/34* (2013.01); *B01J 2219/00157* (2013.01); *B01J 2219/00162* (2013.01); *B01J 2219/00164* (2013.01); *C01B 2203/0233* (2013.01); *C01B 2203/0283* (2013.01); *C01B 2203/042* (2013.01); *C01B 2203/061* (2013.01); *C01B 2203/068* (2013.01); *C01B 2203/0816* (2013.01); *C01B 2203/1604* (2013.01); *C01B 2203/1609* (2013.01); *C01B 2203/1619* (2013.01); *C01B 2203/1633* (2013.01)

(58) Field of Classification Search
CPC .... B01J 2219/00049; B01J 2219/00051; B01J 2219/00157; B01J 2219/00162; B01J 2219/00164; C01B 3/00; C01B 3/02; C01B 3/032; C01B 3/34; C01B 3/38; C01B 3/384; C01B 2203/00; C01B 2203/02; C01B 2203/0205; C01B 2203/0227; C01B 2203/0233; C01B 2203/0283; C01B 2203/04; C01B 2203/042; C01B 2203/043; C01B 2203/06; C01B 2203/061; C01B 2203/068; C01B 2203/0816; C01B 2203/16; C01B 2203/1604; C01B 2203/1609; C01B 2203/1614; C01B 2203/1619; C01B 2203/1628; C01B 2203/1633

See application file for complete search history.

(56) References Cited

U.S. PATENT DOCUMENTS

| | | | |
|---|---|---|---|
| 3,522,019 | A | 7/1970 | Buswell et al. |
| 8,219,247 | B2 | 7/2012 | Esmaili et al. |
| 9,067,786 | B2 | 6/2015 | Meissner et al. |
| 9,404,047 | B2 | 8/2016 | Ito et al. |
| 2003/0101651 | A1 | 6/2003 | Weedon |
| 2005/0089732 | A1 | 4/2005 | Aoyama et al. |
| 2008/0113306 | A1 | 5/2008 | Veasey et al. |
| 2009/0280363 | A1 | 11/2009 | Suehiro et al. |
| 2010/0255432 | A1 | 10/2010 | Fuentes et al. |
| 2011/0183275 | A1 | 7/2011 | Kuske et al. |
| 2011/0265379 | A1 | 11/2011 | Bedetti et al. |
| 2015/0104725 | A1* | 4/2015 | Yang .................. F24H 1/00 122/15.1 |
| 2016/0172698 | A1 | 6/2016 | Ogawa et al. |

FOREIGN PATENT DOCUMENTS

| | | |
|---|---|---|
| DE | 10 2016 221 602 A1 | 5/2018 |
| RU | 2457024 C2 | 5/2011 |

\* cited by examiner

APPARATUS AND METHOD FOR AUTOMATABLE START-UP OF A STEAM REFORMER ARRANGEMENT INTO A NORMAL OPERATING STATE, AND USE AND OPEN-LOOP CONTROL/CLOSED-LOOP CONTROL DEVICE AND COMPUTER PROGRAM PRODUCT

CROSS REFERENCE TO RELATED APPLICATIONS

This application is a U.S. National Stage Entry of International Patent Application Serial Number PCT/EP2020/069265, now WO 2021/018535, filed Jul. 8, 2020, which claims priority to German Patent Application No. DE 10 2019 211 177.7, filed Jul. 26, 2019, the entire contents of both of which are incorporated herein by reference.

FIELD

The present disclosure generally relates to steam reformers, including apparatuses and methods for automatable startup of steam reformer arrangements from a shutdown state into a normal operating state.

BACKGROUND

Steam reformer processes require a comparatively time-consuming or complex starting procedure (start-up). Going from the shut down state of the plant, a comparatively high outlay in terms of personnel and in terms of time is necessary for the steps to normal operation (production at least at a certain minimum level of the maximum output, e.g. at least 40%) or until attainment of the maximum plant output. The time requirement is in many applications significantly more than one or two days. Steam reformers are in many cases coupled to refineries. If the refinery is not operating because the steam reformer is shut down, this can lead to additional costs in the region of, for example, one million US dollars per day.

In many situations, the ignition of, for example, burners and/or the operation of valves and distributors is carried out manually or by individual manual control (manual valves, ignition lances). For example, the appropriate plant components have to be set manually over a comparatively long period of time in such a way that intended parameters in respect of pressure and temperature (in particular heating rate) are adhered to as exactly as possible. For example, operators or controllers also have to monitor the acoustic characteristics of individual flames. Over the time taken for the start-up process, this leads not least to a high personnel requirement. There are often strict upper temperature limits which must not be exceeded. A temperature gradient of, for example, 50 K/h may be mentioned as a normal maximum load of a plant. Since a comparatively large safety factor has to be taken into account for manual operation, this leads to a start-up process in which the temperature gradient is significantly lower.

It has additionally been found that a high proportion of errors or even damage to the plant are attributable to the start-up phase not being properly carried out. There are statistics which, depending on the plant configuration, attribute up to 90% of all errors or damage occurring specifically to the start-up phase, in particular in respect of equipment components or materials used, e.g. catalyst materials. There is therefore interest in optimizing process operation specifically in the start-up phase, in particular to make it more robust, i.e. less susceptible to errors.

In the case of steam reformers, a temperature level of, for example, 700° C. in the reactor (reformer tubes) may be mentioned as lower limit for normal operation. In addition, the instantaneous pressure, which in the start-up phase should likewise increase gradually, depending on the plant configuration, has to be monitored. In addition, numerous streams of media have to be conducted and dimensioned during the start-up phase, in particular for the purpose of recirculation into the process. In parallel thereto, a steam process, for example, should also be monitored and be matched in terms of time to the respective instantaneous operating state in the reactor.

DE 10 2008 046 800 A1 describes a regulating method addressing the problem of avoiding overheating of reformer tubes during a hot start-up.

DE 10 2016 221 602 A1 describes measures for a type of autoignition of burners even in the event of the autoignition temperature not being attained.

US 2011/0265379 A1 describes aspects of gas mixing in connection with integrated start-up burners.

U.S. Pat. No. 2,085,195 describes some safety measures during the start-up phase of process engineering plants.

Thus, a need exists for an apparatus and a method whereby start-up of steam reformer processes can be carried out in an advantageous way, in particular by robust process engineering optimization, in particular in respect of outlay in terms of personnel, especially in respect of automation, standardization, operational safety.

DETAILED DESCRIPTION

Figure 1:
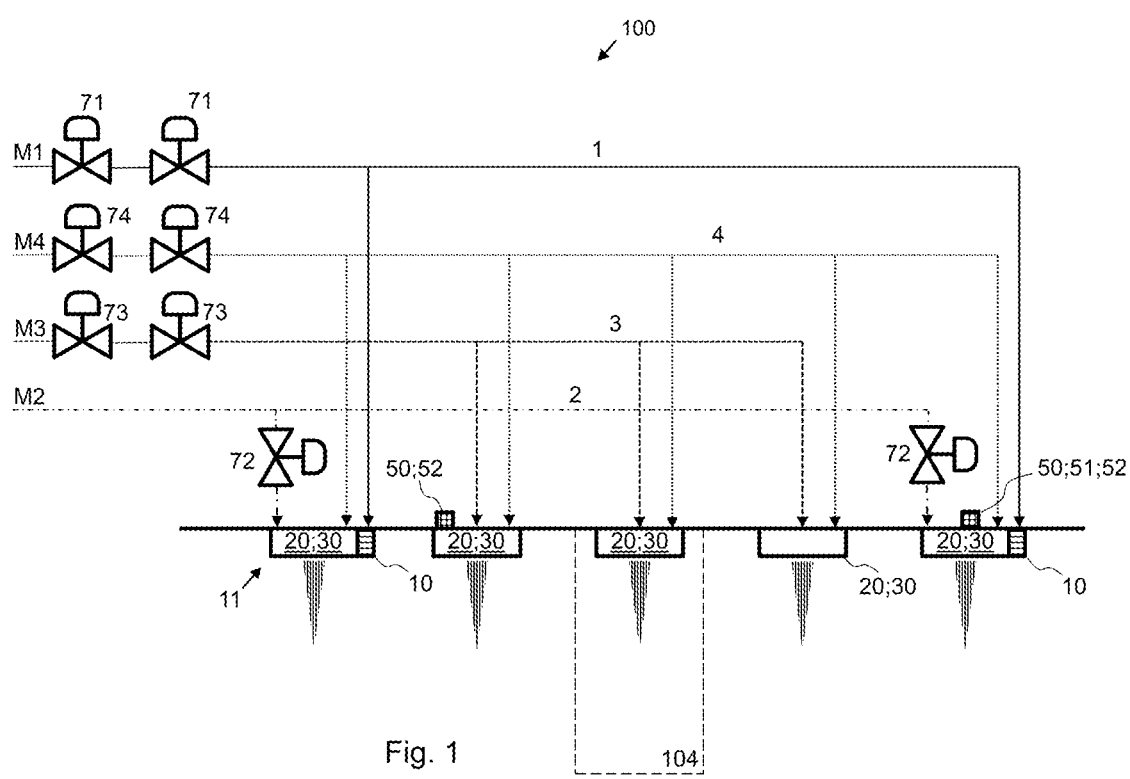
FIG. 1 is a schematic view of burners and streams of media as per an example arrangement.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to apparatuses and methods for automatable startup of steam reformer arrangements into a normal operating state, in particular, from a shutdown state. The present disclosure also relates to the use of a burner arrangement comprising at least three groups of burners each coupled to at least one reactor comprising reformer tubes, for startup of a steam reformer arrangement from the shutdown state into the normal operating state. In particular, the present disclosure relates to startup processes in which a plurality of burners have to be operated such that a particular temperature gradient is not exceeded.

In some examples, a steam reformer arrangement, in particular for the production of hydrogen or methanol or ammonia or synthesis gas, may comprise a plurality of burners coupled to at least one reactor comprising reformer tubes, wherein the steam reformer arrangement is configured for regulated start-up of production; wherein the steam reformer arrangement is configured for automated start-up of production without manual intervention either at distributors or valves or at the burners, wherein the steam reformer arrangement comprises: firstly burners ensuring normal operation, in particular non-start-up burners, and secondly burners provided specifically for start-up, in particular pilot burners and start-up burners, wherein the burners provided specifically for start-up are configured for indirect temperature-dependent ignition of the burners provided for normal operation, in particular in an automated manner as a function of signals from at least one flame monitoring unit and/or at least one temperature measuring unit.

The automated ignition and revving-up can avoid an overload state with good reliability. In particular, any manual handling can be automated. In particular, only the start/commencement of the start-up process is initiated manually. This makes it possible to save, for example, an outlay of several man days. The plant operator optionally retains the choice as to whether the process is to be carried out in a fully automated way or whether individual steps of the process should continue to be manually decided or regulated. In other words: the start-up concept according to the invention offers maximum variability and ability to be individualized.

The final temperature of start-up processes is, for example, in the region of 1000° C. It has been found that a time saving in the region of at least 25% or even up to 50%, i.e. a number of hours, can be realized thanks to the automation according to the invention.

Here, burners provided specifically for start-up (start-up burners) can optionally also be utilized at least partly, if desired in their entirety, in normal operation.

In manual start-up procedures employed hitherto, there is the risk of human error, with serious disadvantageous effects. Example 1: the manual ignition of burners is carried out in such a way that an excessively high temperature gradient is established—this can lead to failure of materials and overfiring.

Example 2: all burners are accidentally ignited at the same time—in the case of a reformer arrangement having, for example, 200 tubes this can possibly lead to a loss of all tubes (material costs in the region of, in particular, 2 million euros), and possibly to a plant downtime of several months, which would be associated with great financial losses.

The high utility of the automation measures according to the invention can be seen from these examples.

The invention is based on the concept of providing an apparatus and a method by means of which it can optionally be made possible to initiate the start-up process by a single start triggering operation (keyword: "single ramp-up button"). This degree of automation can firstly ensure high standardization and simple and systematic monitoring of the process (keyword: "process control system"), and secondly the outlay for plant operators is appreciably minimized. This "single ramp-up button" concept can, by way of example but not exclusively, be realized in start-up processes for, in particular, hydrogen production or methanol production or ammonia production. The expression "single ramp-up" refers to a "single-button or single-switch start-up concept", i.e. a single switch (start button) or a single switching point for controlling and initiating a start-up sequence for the reformer process. In particular, the present invention can be applied to all types of hydrogen production processes in which steam reformer technology is employed. The start of the start-up process can, in particular, be defined as the commencement of operation of nitrogen gas regulation, and the end can be defined, in particular, as the point in time of commencement of a pressure swing adsorption (optionally in combination with the flaring of hydrogen).

In particular, the operating personnel can be relieved of all steps of the start-up sequence which were hitherto usually carried out manually by an automatic and controlled or regulated plant start which can be standardized.

The ratio of the number of burners provided for normal operation (main burners or non-start-up burners) to the number of burners additionally provided for the start-up process (start-up burners or analogously pilot burners) is, for example, in the region of 3:1. In other words: by way of example, 100 start-up burners and 100 pilot burners which are configured for providing an autoignition temperature for about 300 main burners are provided. A number of 200 main burners, for example, is also customary.

The burners provided specifically for start-up (for the start-up process) can, for example, comprise two different types of burners and be arranged in clusters, in particular with at least one pilot burner per cluster.

If desired, separate or additional fuel gas distributors or flow regulators configured for the start-up sequence according to the invention can be provided, in particular for offgas and/or purge gas (flushing gas) and/or for start-up steam.

If desired, additional let-down valves configured for the start-up sequence according to the invention can be provided, especially downstream of fuel gas regulating devices (in particular fuel gas "let down").

If desired, additional let-down valves configured for the start-up sequence according to the invention can be provided, in particular downstream of burners which are, for example, coupled to a fuel gas distributor or to a fuel gas flow regulator at the top of the reformer, and/or let-down valves coupled to steam drums, and/or let-down valves coupled to a desulfurization section.

According to one working example, the steam reformer arrangement is configured for a three-stage ignition sequence comprising two ignitions before the final ignition of a respective main burner (non-start-up burner). This also makes operationally reliable automation possible.

In one working example, the steam reformer arrangement comprises: a first group of burners configured as pilot burners, a further group of burners configured as start-up burners, where the steam reformer arrangement is configured for providing the autoignition temperature (AIT) in the reactor by means of the first two groups of burners, so that after attainment of the autoignition temperature a further group of burners configured as non-start-up burners can be ignited indirectly, in particular indirectly exclusively by introduction of fuel gas. In this way, a very large proportion of previously manual work can be automated and standardized by means of simple measures.

In one working example, different groups of burners are distributed spatially in clusters and in the clusters are arranged relative to one another, in particular at least at least one pilot burner in relation to at least one start-up burner in a respective cluster. In this way, the regulation can also be individualized; in addition, scaling of apparatus and method is made easier. Here, the non-start-up burners can be arranged spatially separately from the start-up burners.

It has been found that a particularly perceptible process optimization, in particular in respect of a very exact temperature-/time-controlled start-up sequence, can be achieved by means of automatically ignitable pilot burners which are each coupled to start-up burners.

In one working example, the burners are arranged in two different types of clusters, namely in a plurality of first clusters comprising at least pilot burners and start-up burners and a plurality of second clusters comprising at least non-start-up burners, where at least three conduits comprising at least one start-up fuel gas conduit and at least one pilot gas conduit and at least one offgas conduit lead to each of the first clusters and at least two conduits comprising at least one non-start-up fuel gas conduit and at least one offgas conduit lead to each of the second clusters. The flow in each conduit is preferably able to be regulated individually, in particular at least the flow for the start-up burners and the non-start-up burners. In other words: a flow regulation for the pilot burners is not necessarily required. If desired, the non-start-up burners in the second clusters are each arranged individually. In other words: the second clusters do not necessarily comprise a plurality of burners but have at least two conduits or connections for medium.

For example, the pilot burners receive a fixed admission pressure and remain unregulated. The start-up burners can, in particular, be regulated via the temperature gradient at the reformer tube outlet. Here, the burner admission pressure can be set so that a predefinable gradient, in particular a maximum of 50 K/h, is not exceeded.

In one working example, each start-up burner is assigned a pilot burner, in particular in a pairwise cluster arrangement. This also maximizes the flexibility in respect of the ignition system; in particular, each start-up burner can be controlled individually.

In one working example, the individual non-start-up burners can be ignited individually or together as a complete group by autoignition, in particular indirectly exclusively by introduction of fuel gas. The start-up concept of the invention makes it possible to start the main burners individually as a function of the operating state, with only fuel gas having to be supplied in the desired way. The steam reformer arrangement can have at least one flow regulator, in particular configured for regulation in steps in the range from 0.5% to 5% of normal operating throughput, for the non-start-up burners, individually or together.

In one working example, the steam reformer arrangement comprises a distributor for a respective start-up burner. The steam reformer arrangement can have a distributor for a respective non-start-up burner, and/or a flow regulating valve for a respective non-start-up burner. In this way, the variability of the process can be optimized further.

In one working example, the steam reformer arrangement comprises at least one flow regulating valve for start-up steam, in particular able to be regulated for flows in the range from 5% to 40% and more relative to 100% flow corresponding to normal operation, in particular able to be regulated with a step accuracy of at least 0.5% of the flow for normal operation. In this way, an advantageously fine matching can be ensured in a start-up phase with comparatively low output or in the case of possibly comparatively unstable operating conditions.

The steam reformer arrangement can comprise at least one temperature measuring unit, in particular a temperature measuring unit at the inlet to a high-temperature shift (process or plant component) or CO conversion reactor and a temperature measuring unit at the reactor outlet or reformer outlet.

The steam reformer arrangement can comprise at least one pressure measuring unit, in particular a pressure measuring unit for process pressure in the reactor, a pressure measuring unit for steam pressure, a pressure measuring unit for export steam pressure and/or a pressure measuring unit for PC vapor pressure.

The steam reformer arrangement can comprise at least one flame monitoring unit, in particular a plurality of flame monitors, for individual pilot burners or all pilot burners and/or for individual start-up burners or all start-up burners and/or for individual non-start-up burners or all non-start-up burners. This also gives good controllability.

According to the invention, the abovementioned object is also achieved by a method for starting up a steam reformer arrangement (in particular from the shut down state) into the normal operating state, in particular for the production of hydrogen or methanol or ammonia or synthesis gas, wherein a plurality of burners coupled to at least one reactor having reformer tubes are controlled and regulated, wherein the start-up is carried out and regulated in an automated manner without manual intervention either at distributors or valves or at the burners by the burners ensuring normal operation (production operation), in particular non-start-up burners, being ignited indirectly as a function of temperature by means of burners provided specifically for start-up (for the start-up process), in particular pilot burners and start-up burners, in particular as a function of automatically evaluated flame monitoring and/or temperature monitoring at least at (the) pilot burners. This gives advantages as mentioned above. In particular, the process can optionally be initiated fully automatically according to a prescribed sequence, or a conventional start-up with optional manual interventions can likewise be realized as an alternative.

In an embodiment, the burners ensuring normal operation are ignited indirectly as a function of temperature by autoignition as a result of the burners provided specifically for start-up (start-up burners) being ignited beforehand indirectly by pilot burners. This three-stage ignition sequence gives advantages in respect of automatability.

In an embodiment, the start-up is carried out and regulated in an automated manner by a first group of burners firstly being ignited as pilot burners in a first start-up phase and a further group of burners then being ignited as start-up burners, in particular by means of the pilot burners, with these first two groups of burners being operated in such a way that the temperature in the reactor rises above the autoignition temperature of the fuel gas mixture, and after attainment of the autoignition temperature the burners provided for normal operation (here referred to as non-start-up burners or main burners) in a further group of burners being ignited and operated in a further start-up phase, either individually or as the entire group. In this way, the start-up process can, in particular, also be combined advantageously with a start-up phase for steam operation.

The ignition of the pilot burners can, for example, be effected by electric ignition over a time of some seconds, in particular in the one-figure second range. The ignition of the pilot burners can, for example, encompass monitoring of the ignition process, in particular on the basis of detection of a flame within a few seconds.

The ignition of at least one start-up burner can be effected as a function of the state of the pilot burners, in particular depending on whether all pilot burners have ignited. An appropriate clearance signal can be generated for this purpose.

The non-start-up burners can be ignited indirectly, in particular by metered introduction of the appropriate burner medium.

Tests for freedom from leaks can optionally be carried out, in particular before start-up, in particular at least in respect of pilot gas conduits.

In an embodiment, all pilot burners of the steam reformer arrangement are firstly ignited, after which a single first start-up burner is ignited, in particular indirectly via a corresponding pilot burner, with further start-up burners each being ignited only after a minimum period of time, in particular at the earliest after some minutes. This sequence not least also gives good control and high operational safety, in particular with exact temperature regulation, in particular with maintenance of a maximum temperature ramp of, for example, 50 K/h.

It has been found that a phase of some minutes in the lower two-figure range, e.g. at least about 10 minutes, between ignition of the individual start-up burners is advantageous, especially in respect of reaction times of the reformer (in particular dead times in the region of some minutes). It has been found that changes in the process states can be evaluated by measuring instruments after about 10 minutes with good stressability (measurement data reliability). Maintenance of such hold times during the start-up process can ensure particularly good stability of the start-up sequence.

In an embodiment, the start-up burners are controlled and regulated in the opposite way to the non-start-up burners, in particular in respect of the flow of fuel gases. In other words: the start-up burners can be run down (reduction of the flow of the fuel gas supplied) to the same degree as the non-start-up burners are run up (increase in the flow of the fuel gas supplied).

In an embodiment, the individual start-up burners are ignited sequentially after one another as a function of a temperature ramp in the reactor, in particular at a temperature increase of less than or equal to 100 K/h, in particular less than or equal to 50 K/h. Here, the individual start-up burners can be ignited sequentially after one another until a predefinable reactor outlet temperature has been attained, in particular at a reactor outlet temperature of at least 350° C. In this way, the temperature-regulated start-up can, in particular, also be carried out indirectly via the number of the start-up burners which have been activated. This process variability is also particularly advantageous in respect of good process reliability and variability of the start-up process, if designed in the individual case. For example, an excessive temperature rise can be countered by reducing the number of active start-up burners. The regulating range for the reactor outlet temperature can be defined, for example, as from 300 to 400° C., depending on the individual application.

In an embodiment, the non-start-up burners are ignited by autoignition (either individually or together) as a function of a minimum temperature threshold in the further start-up phase, in particular indirectly by introducing fuel gas, in particular gradually with stepwise increase in the fuel gas throughput, in each case after a time of at least some minutes, in particular on the basis of flow regulation of the fuel gas (in particular in steps of from 0.5% to 5% of the normal operating throughput over a period of time of several hours), in particular with regulated matching with a pressure regulation as a function of the instantaneous reactor outlet temperature. In particular, good robustness can also be ensured by the indirectly initiatable autoignition.

In an embodiment, at least three streams of medium are regulated for the start-up, in particular in dependence on one another, comprising pilot gas for the pilot burners, fuel gas for the start-up burners, fuel gas for the non-start-up burners, with the respective stream of medium preferably being fed via a central distributor to the appropriate burners. This scope of regulatability is also advantageous in respect of variability and robustness of the process.

In an embodiment, the start-up process is carried out in at least three successive start-up phases until the normal operating state has been attained or until the product, for example hydrogen, has been provided, with a hold phase being set or adhered to after at least one of the start-up phases and the subsequent start-up phase being able to be initiated individually, especially by an operator giving clearance for transition to a subsequent phase. In this way, the operational reliability and the robustness of the start-up process can be optimized further. In an advantageous embodiment, the process is divided into precisely three start-up phases.

In an embodiment, the start-up process is carried out in three successive start-up phases followed by an operating phase, namely a/the first start-up phase comprising ignition both of the pilot burners and of the start-up burners (and in particular also operation of the plant using nitrogen in the process path), a second start-up phase comprising (purely) steam operation (optionally a mixed operating mode using nitrogen and steam), a third start-up phase comprising the (auto)ignition of the non-start-up burners and introduction of feed gas (in particular nitrogen), with production being carried out in the subsequent operating phase, in particular with the operating phase comprising at least one pressure swing sequence for start-up of a pressure swing adsorption. This type of start-up has been found to be particularly advantageous for hydrogen production. Downstream of the operating phase, it is then possible to utilize an offgas (not the same as product gas), in particular for recirculation and recovery of heat for the steam reformer process. In production of methanol, ammonia or a further product, the operating phase can also comprise other processes (not the same as the pressure swing adsorption). In particular, only an offgas from a downstream process unit or from beyond the plant boundary can also be supplied to the operating phase as an alternative.

It may be mentioned that the burner ignition phases and the phases of supply with media in the process path can be individualized depending on the plant configuration. For example, non-start-up burners of a first plant are ignited when the introduction of steam is commenced and in a second plant only when feed gas is introduced into the plant.

A hold phase also makes it possible, in particular, for the instantaneous operating state to be defined as stable or appropriate by an operator in order to initiate the subsequent start-up phase or the operating phase. This option for further monitoring can optionally be utilized, in particular with a view to maximum operational reliability.

In an embodiment, the temperature is regulated by at least the temperature in the reactor and/or at the reactor outlet and optionally also an inlet temperature for regulating the respective start-up phase being monitored. Here, a first temperature threshold in the range from 150° C. to 250° C., in particular of at least 200° C., can be measured in the flue gas or at the reactor outlet and when exceeded a temperature gradient of not more than 100 K/h, in particular not more than 50 K/h, can be set by sequential ignition of further start-up burners. This allows comparatively quick or uncomplicated attainment of a minimum temperature from which a predefined ramp can be started.

Temperature-controlled regulation can, in particular, also relate specifically to an exit temperature at the reformer outlet and/or to a flue gas temperature on the flue gas side (flue gas tunnel, transition channel). In other words, the regulation can optionally be carried out on the basis of the reformer temperature and/or on the basis of the flue gas temperature.

A further temperature threshold in the region of 200° C. can be measured in the flue gas or at the reactor outlet, on which steam valves (in particular steam let-down valves on steam generators) are closed or adjusted. This also allows advantageous matching of pressure systems to one another, in particular synchronization of process gas pressure and steam pressure in at least one steam system.

A further temperature threshold in the region of 350° C. can be measured in the flue gas or at the reactor outlet, up to which sequential ignition of further start-up burners is continued. This threshold can, in particular, be evaluated as starting point for initiation of a subsequent start-up phase.

A further temperature threshold of at least 250° C. and/or at least 350° C. can be measured in the flue gas or at the reactor outlet, and when the temperature threshold is exceeded a pressure regulation in the reactor and/or in a steam system is activated, in particular by increasing the pressure to at least 20 bara and/or by setting a pressure gradient of 0.5 bar/min, in particular in the first and/or second start-up phase. The parallel pressure regulation above this temperature range also gives, in particular, high system reliability. The pressure regulation is preferably in any case effected at least in the steam system.

A further temperature threshold of at least 350° C. can be measured in the flue gas or at the reactor outlet and/or a further temperature threshold of at least 180° C. of a high-temperature shift or CO conversion reactor can be measured, and if exceeded a/the further, in particular second, start-up phase is initiated, in particular by introduction of steam into the reactor. This also gives an advantageous compromise or process point in time for the initiation of further start-up steps.

In the present disclosure, a high-temperature shift (process or plant component) can also be referred to synonymously as a CO conversion reactor.

A further temperature threshold of 500° C. can be measured and if exceeded a pressure regulation in the reactor for setting the intended operating pressure is activated, in particular by setting a pressure gradient in the range from 0.5 bar/min to 1 bar/min. These thresholds have been found to be an advantageous compromise, in particular in respect of the controllability of pressure valves.

A pressure regulation in the reactor for setting the intended operating pressure can be activated at a temperature threshold lower than a further temperature threshold for the ignition of the non-start-up burners, in particular by setting a pressure gradient in the range from 0.5 bar/min to 1 bar/min. This process variation can also be managed well.

A further maximum temperature threshold of 700° C. can be measured in the flue gas or at the reactor outlet, up to which ignition of the start-up burners is continued and when exceeded a/the further, in particular third, start-up phase is initiated, in particular by ignition of the non-start-up burners. This gives an advantageous compromise or process point in time for initiation of further start-up steps. In particular, it has been found that the desired autoignition conditions can be ensured with good reliability above this temperature threshold. The autoignition temperature (AIT) can also be dependent on the fuel gas composition. The temperature threshold of 700° C. has been found to be advantageous, in particular for natural gases, especially for natural gases which are used mainly as fuel gas for hydrogen and ammonia plants.

A further maximum temperature threshold in the range from 850° C. to 1050° C. can be measured in the flue gas or at the reactor outlet, up to which feed gas is introduced at a throughput/flow which increases with time. Above this threshold, a transition to normal operation is particularly advantageous.

Here, a time-based temperature gradient of not more than 100 K/h, in particular not more than 50 K/h, temperature rise in the respective phase can be set. This also gives an advantageous compromise between robustness, stability and process duration. A respective start-up phase can be initiated as a function of minimum temperature thresholds (lower limit). The temperature control allows, particularly in combination with the lighting of individual burners, an advantageous process procedure.

The formulation "in the region of" here encompasses, in particular, both exactly the specified value and also small process or regulatory variations in the single-figure percentage range.

In an embodiment, pressure regulation is carried out as a function of the reactor outlet temperature, in particular pressure regulation in the steam system. This also makes good control of the effects in the reactor possible. Here, the pressure can, in particular, be increased to at least 20 bara in the first start-up phase. In the first and/or second start-up phase, a rising pressure gradient, in particular in the range from 0.5 bar/min to 1 bar/min, can be set. In a/the third start-up phase, a rising pressure gradient of, in particular, 10 bar/h can be set in the steam system or in the plant front end. This has in each case been found to be a particularly useful process engineering parameter range.

It has been found that automated pressure regulation likewise makes a great savings potential or a great efficiency increase possible. Hitherto, it was often customary to carry out pressure regulation manually, i.e. by a pressure matching being carried out stepwise manually. In steam reformer arrangements, at least two or three pressure systems usually have to be matched to one another, namely the process gas pressure and the pressure in at least one steam system (frequently in at least two steam systems). In particular, the instantaneous process gas pressure has to be set so as to be less than the instantaneous steam pressure. According to the invention, this pressure regulation can also be carried out in an automated manner.

In one embodiment, a load or a flow of the respective medium of not more than 40% of the maximum output or of the maximum plant load is set in the respective start-up phase, in particular by regulating the flow of steam and/or feed gas. In this way, the gradual start-up ramp can be run up to an advantageous handover point for normal operation, in particular as advantageous compromise between operational reliability, process stability and time outlay.

In an embodiment, at least one entry boundary condition from the following group is ensured for the start-up: nitrogen flushing completed, automatic pressure regulation of reactor switched on, reactor outlet temperature is actively regulated as a function of pressure and throughput of fuel gas. In this way, a plausibility test can be carried out or a subsequent process step can be initiated. A nitrogen admission pressure can optionally be controlled.

In particular, all process media, for example also imported steam, are available at the steam reformer plant boundary or are provided there.

In particular, a boiler feed water system (deaerator and steam drums, pumps) is filled and in operation.

In particular, fill level monitoring devices on the steam drums are in AUTO mode, in particular with a set point at about 10% below the normally customary operating point.

In particular, the process system has been flushed and brought to pressure by means of nitrogen.

In particular, flue gas ventilators and combustion air ventilators are in operation, in particular at a minimum flow rate.

In particular, all subsystems (fuel gas, feed gas, steam) are coupled-in or connected.

In particular, all temperature monitoring devices which utilize boiler feed water injection by means of steam coolers are in AUTO mode, in particular with envisaged set point for a normal customary operating point. For steam superheaters, it can be useful to reduce the set point so that attainment or exceeding of the customary intended/operating temperature during the start-up phase(s) is avoided.

In particular, a pressure monitoring device coupled to the reformer tubes is in AUTO mode, with, in particular, a regulating loop for maintaining the pressure in the reformer being active.

In particular, a regulating loop for setting the outlet temperature at the process gas cooler is in AUTO mode.

In particular, fill level monitoring devices of process condensate separators are in AUTO mode, and the system is switched on-line and configured for removing process condensate as soon as steam is introduced into the system.

In particular, nitrogen is circulated in the process gas system, in particular by means of a compressor.

In particular, automatic let-down valves on steam drums are in the open position.

In particular, let-down valves of both steam systems (high-pressure and process condensate) through to a steam silencer are in the open position.

In particular, the reformer outlet temperature is set or regulated in a cascade mode (order of precedence: temperature before fuel gas pressure or fuel gas throughput). The set point can be prescribed sequentially, in particular taking into account an intended temperature curve (desired or predefined heating rate).

In particular, rotating equipment is kept ready in an adequately prepared state and is ready for operation.

In particular, cooling water is supplied to all consumers in the process.

In particular, an air cooler is in operation.

In particular, an outlet valve upstream of a pressure swing unit is in AUTO mode, in particular with a set point at 7 bar.

In an embodiment, at least one of the following parameters is monitored during start-up: throughput of the medium supplied to the non-start-up burners (in particular fuel gas), flame characteristics of a respective pilot burner, flame characteristics of a respective start-up burner. The process can be automated in a particularly simple and robust manner by monitoring of the throughputs and flames.

In an embodiment, at least one regulating loop in respect of at least one parameter from the following group: steam/carbon ratio, reactor/reformer outlet temperature, reactor pressure or system process pressure, throughput of medium (in particular air throughput, product output "hydrogen to feed"), steam pressure (in particular head pressure of export steam), process condensate vapor pressure (in particular head pressure) is carried out during start-up, in particular in combination with the above-described single-button start-up concept. Comprehensive monitoring of the process is ensured in this way.

In an embodiment, the method also comprises at least partially automated running-down of the steam reformer arrangement from the normal operating state, in particular into a standby state or into a completely shut down state, in particular in the reverse order of steps of the above-described start-up. In this way, the above-described advantages can also be realized for running down (synergistic effects in implementation).

The abovementioned object is, according to the invention, also achieved by a control/regulation device configured for carrying out a method as claimed in any of the preceding method claims, wherein the control/regulation device is coupled to at least three groups of burners comprising pilot burners, start-up burners and non-start-up burners, where the control/regulation device is additionally coupled to at least three distributors for at least three streams of media comprising the media pilot gas, fuel gas for start-up burners, fuel gas for non-start-up burners, and is configured for regulating these streams of media, in particular in time dependence on one another and/or as a function of temperature. This gives advantages as mentioned above.

The abovementioned object is, according to the invention, also achieved by use of a burner arrangement comprising at least three groups of burners, in each case coupled to at least one reactor having reformer tubes, for starting up a steam reformer arrangement, in particular from the shut down state, into the normal operating state, in particular for the production of hydrogen or methanol or ammonia or synthesis gas, in particular in an above-described steam reformer arrangement, wherein a first group of burners are controlled and operated (in particular in a fully automated manner without manual intervention in respect of ignition of the start-up burners) as pilot burners for ignition, in particular sequential ignition, of a second group of burners, namely start-up burners, and the start-up burners (second group) are controlled and operated, at least up to a minimum temperature threshold corresponding to an autoignition temperature of the third burner group, namely non-start-up burners, in such a way that the non-start-up burners can then be ignited indirectly by introduction of fuel gas at or above the autoignition temperature, in particular in a temperature- and pressure-controlled manner up to a predefinable normal operating temperature at the reactor outlet (in particular 850° C.). This gives advantages as mentioned above. In particular, it has been found that a very large proportion of effort can be saved by the automated ignition of the start-up burners.

The abovementioned object is, according to the invention, also achieved by a computer program product configured for carrying out a method as claimed in any of the preceding method claims when the method is carried out on a computer, wherein a control/regulation sequence both for controlling burners provided for normal operation (non-start-up burners) and burners provided specifically for start-up (in particular pilot burners and corresponding start-up burners) is ensured, in particular in respect of temperature-dependent points in time of ignition and/or media streams/flows, by means of the computer program product. In particular, the parameter curves desired in each case, in particular intended temperature/pressure curves, can be calculated continuously and prescribed on the basis of an instantaneous process situation. Here, maximum/minimum thresholds for a respective parameter can be prescribed in each case.

A temperature-dependent and/or pressure-dependent prescribed time for ignition of individual burners among the burners can be prescribed or can be prescribable by means of the computer program product, in particular as a function of an instantaneous temperature gradient. The maximum temperature gradient can, for example, be predefined as 50 K/h, so that the lighting of the burners is, for example, regulated in a range from 40 K/h to 50 K/h or from 45 K/h to 50 K/h. The ignition and the operation of individual burners can thus occur in relation to a temperature gradient in the range from, for example, 43 K/h to 48 K/h. This also allows particularly time-efficient start-up at the upper limit of a permissible temperature gradient.

In the following, specific examples of sequences of a respective start-up phase or in a subsequent operating phase are given.

Illustrative sequences, in particular in a first start-phase

The first start-up phase can also be referred to as "nitrogen start-up in combination with start-up burner ignition". Entry boundary conditions as mentioned above are in particular all satisfied. The following sequences can, in particular, be initiated in a fully automated manner in reaction to the actuation of the "single ramp-up button", in particular also depicted:

1.1/ flushing of the steam reformer(s) before ignition, in particular for 15 minutes after initiation of the starting procedure.

1.2/ automatic test for freedom from leaks of the fuel gas system: introduction of nitrogen and holding of the test pressure; after the test, an emergency shutdown valve upstream of each burner is reset, in particular for 2 minutes, in order to discharge test gas.

1.3/ automatic testing for freedom from leaks of the offgas system: introduction of nitrogen and holding of the test pressure.

1.4/ resetting of valves, in particular for 1 minute, in order to supply pilot gas to the burners and valves/distributors; ignition of pilot burners, in particular by means of electric flame ignition, in particular for 5 seconds, monitoring of a flame detection signal, in particular within a time window of 10 seconds after ignition; as soon as a flame is detected/confirmed at all pilot burners, clearance for ignition of a first start-up burner.

1.5/ resetting of a/the automatic vent valve which is coupled to the fuel gas distributor at the top of the reformer and also of a/the vent valve downstream of the first fuel gas "let down"; if appropriate regulation of the speed of opening of the valves, in particular limitation of the speed in order to avoid effects on the fuel gas pressure regulator; as a result of these steps, fuel gas flows through the distributors and valves; the test gas is replaced by fuel gas over a period of, for example, about 5 minutes (gas exchange phase); after about 5 minutes, clearance for resetting a safety valve (ESDV=emergency shutdown valve) upstream of the respective start-up burner can be given.

1.6/ ignition of the first start-up burner: resetting of the fittings involved; gradual opening (within 30 seconds).

1.7/ after 10 minutes: ignition of the second start-up burner; resetting of the fittings involved.

1.8/ continuation of the ignition sequence until the flue gas temperature reaches 200° C.; then maintenance of a temperature gradient of max. 50 K/h.

1.9/ a/the automatic vent valve for the fuel gas and also a/the vent valve downstream of a/the fuel gas "let down" are slowly closed (in particular closure over a period of, for example, two minutes) as soon as about at least five start-up burners are in stable operation with flame signal.

1.10/ continuation of the ignition sequence until the flue gas temperature reaches 350° C., in particular by starting/ ignition of as many burners as possible and by increasing the pressure of the fuel gas; when/as soon as all start-up burners are in operation, a temperature regulator which regulates the reformer outlet temperature (cascade to the fuel gas pressure) is switched into the auto-operation mode, in particular with a prescribed temperature ramp of, for example, not more than 50 K/h.

1.11/ parallel to ignition of the burners, valves (in particular the let-down valves) of steam drums are closed, in particular when the reformer outlet temperature reaches 200° C.

1.12/ as soon as the reformer outlet temperature reaches 250° C., the pressure in steam systems, in particular in the two steam systems, is increased to 20 bara (relative to: t_sat=212° C.), in particular at a gradient of 0.5 bar/min; this gradient (pressure ramp) can be depicted by a signal in the region of (a few) seconds, as a result of which good regulability or reactivity can be ensured for regulation (reactivity of the pressure valves involved); here, a pressure gradient determination can be implemented individually.

1.13/ as soon as the reformer outlet temperature exceeds 350° C., an inlet temperature of a high-temperature shift of greater than 180° C. is set and the process is stabilized so that the operator can activate the next step of the start-up sequence (second start-up phase).

Illustrative sequences, in particular in a second start-up phase

The second start-up phase can also be referred to as "steam start-up".

2.1/ a bypass connection of the main steam flow regulating valve is equipped with a separate start-up regulating valve.

2.2/ the start-up steam regulating valve is gradually open, in particular by 5%. The system is kept in this state for, in particular, a time of 30 minutes. After the hold time, the steam flow is increased, in particular by 0.5% per minute (based on 100% load), in particular up to an operating point corresponding to 40% load of the steam flow.

2.3/ parallel thereto, the ignition sequence is continued, in particular at a temperature gradient below 50 K/h, in particular until the reformer outlet temperature reaches 700° C., in particular by ignition of more and more start-up burners and by subsequently increasing the pressure.

2.4/ as soon as the reformer outlet temperature reaches 500° C., the pressure in both steam systems is increased to the normal operating level, in particular at a pressure gradient of 0.5 bar/min, in particular on the basis of a signal which recurs within a few seconds and is coupled to at least one pressure regulating valve.

2.5/ a/the nitrogen circulation is interrupted as soon as the reformer outlet temperature reaches 700° C.; in particular, the nitrogen flow is reduced by closing regulating valves within 5 minutes; the nitrogen circulation valve is opened; when the nitrogen regulating valve is closed, the nitrogen compressor is automatically stopped.

2.6/ as soon as the reformer outlet temperature exceeds 700° C., sufficiently stable operating conditions can be assumed and an operator can initiate the third start-up phase (optionally fully automatic initiation).

Illustrative sequences, in particular in a third start-up phase

The third start-up phase can also be referred to as "feed in".

3.1/ before further gas is fed to the process, the non-start-up burners are ignited; the non-start-up burners are supplied with fuel gas via at least one appropriate fuel gas distributor; the operator can for this purpose open, for example, valves upstream of each burner; flow regulators for non-start-up burners are, in particular, opened by, for example, 5% for, for example, 5 minutes; here, a hold phase or a phase with regulation in equal steps for, for example, at least 15 minutes can be adhered to, in particular for the purpose of process stabilization; for example, the respective regulating valve is opened stepwise to 100% over a regulating interval of 3 hours; here or as a result, pressure regulation can be carried out, in particular by appropriately regulating the reformer outlet temperature.

3.2/ a nitrogen circulation is interrupted; a main feed regulating valve upstream of a feed gas/steam mixing point is closed; a configuration with block and let-down distributors (valve combination with double block and unloading/intermediate let-down=db&b double block and bleed) of the nitrogen supply isolates the nitrogen.

3.3/ a/the automatic vent valve downstream of a/the desulfurization section is gradually opened, in particular in order to set a feed gas flow corresponding to 40% plant load (or 40% of the maximum output).

3.4/ a/the inlet valve at the plant boundary is gradually opened, in particular for gradually pressurizing the system at a pressure ramp of, for example, 10 bar/h.

3.5/ as soon as the standard operating pressure of the desulfurization section has been ensured, feed gas is supplied to the process.

3.6/ the main inflow valve (feed valve) is, in particular, opened by, for example, 5% for, for example, 5 minutes, in particular to initiate steam reforming; a pressure at the burners can be adjusted accordingly, especially since the temperature in the reactor initially decreases due to endothermic reactions.

3.7/ for stepwise running up to 40% plant output, the feed gas throughput (feed flow) is increased stepwise from a 5% valve setting, in particular by 0.25% additional valve opening per minute; in particular, a reactivation procedure (after steam contact), also depending on the catalyst materials used, can be provided for ammonia plants.

3.8/ the steam flow rate is maintained; as soon as 40% of the maximum output has been reached, a regulating system for the steam/carbon ratio is activated, with the steam flow rate being decreased to a standard operating value, in particular at a ramp of 1000 kg/h/h.

3.9/ in parallel with the increase in the feed flow rate, the pressure in the back end of the plant (from mixing of feed gas/steam through to, for example, a process section upstream of a pressure swing adsorption) is increased, in particular by throttling of at least one vent valve in the appropriate process section, in particular at a ramp of 0.1 bar/min, until standard operating parameters have been attained.

3.10/ in parallel to the increase in the feed flow rate, the reformer outlet temperature is increased to standard operating parameters, in particular at a ramp of less than 50 K/h, in particular up to about 850° C.

The steam reformer arrangement is now fully operational and can produce crude hydrogen which is, for example, supplied to a pressure swing adsorption process.

Illustrative sequences, in particular in a subsequent operating phase

The following examples are given for hydrogen as product.

4.1/ the safety valve (ESDV) arranged upstream of the process swing adsorption (PSA) is reset and slowly opened, in particular over a time of at least 5 minutes, to pressurize the pressure swing adsorption; an automatic bypass can optionally be provided.

4.2/ a pressure regulating valve downstream of the pressure swing adsorption is completely closed.

4.3/ the two vent valves for product medium (hydrogen) and offgas are in an AUTO regulating state, with the standard operating parameters as reference.

4.4/ the pressure swing adsorption process is started when the pressure has equalized.

4.5/ a pressure regulating valve upstream of the pressure swing adsorption is slowly closed, with the pressure-regulated vent valve arranged downstream being opened in order to maintain the pressure for the PSA.

4.6/ hydrogen is provided for flaring; PSA offgas is collected and likewise provided for flaring, in particular via a pressure regulating valve of the offgas system.

4.7/ after a PSA operating phase of, for example, 30 minutes, pure hydrogen is recycled for the hydrogenation reactor of the desulfurization section; a hydrogen compressor is automatically started, with the valve regulating the flow to the hydrogenation reactor being closed; after, for example, 5 minutes operating time of the hydrogen recycling compressor, the hydrogen throughput is run up to standard operating parameters, e.g. with a ramp of 10 standard m$^3$/h/h.

4.8/ the operator opens the/all valves upstream of the burners before PSA offgas is admitted; one or more regulating valves for the PSA offgas are slowly opened, in particular in 5% steps; the first (smallest) open position is maintained for, in particular, 15 minutes; this has been found to be advantageous for stabilizing temperature and reformer pressure regulation.

4.9/ after, for example, 10 minutes, the PSA offgas throughput is run up according to a predefinable ramp, in particular in such a way that the entire offgas is conveyed to the reformer, i.e. without offgas being flared; for example, this flow/distributor regulation is effected over a time of 60 minutes.

The plant is now, in particular, in operation at 40% load. The load can now be increased as desired with good process reliability and process stability, in particular using an automated process control system.

The throughput of combustion air is, in particular, still at a minimum. To increase the plant load, the combustion air throughput can be increased on the basis of a prescribed dependence (function, ramp), in particular as a function of the output, in particular fully automatically.

An operator can optionally intervene in the automated start-up process during the start phase or individually regulate or adapt this; the automated start-up process is interrupted at this point in time (instruction hierarchy favors individual regulation); the operator gives clearance for the optional automated continuation of the automated start-up process; the operator optionally continues the process manually at least to the next start-up phase, after which the process can then be continued fully automatically again in a particularly simple manner.

In the case of reference symbols which are not described explicitly in respect of a particular figure, reference is made to the other figures. The figures are, for the purpose of easier understanding, described at least partly together with reference to all reference symbols. Details or peculiarities shown in the respective figures are described individually.

FIG. 1 shows four different conduit systems each having a specific function, with the conduit systems supplying at least three types of burner of a steam reformer arrangement 100 and regulating at least four streams of media.

A first conduit system 1 (continuous lines) is provided for a first group of burners 10, namely for pilot burners. A second conduit system 2 (dash-dot lines) is provided for a second group of burners 20, namely for start-up burners. A third conduit system 3 (broken lines) is provided for a third group of burners 30, namely for non-start-up burners or main burners.

A first medium M1, namely pilot gas, is fed via the first conduit system 1 to individual burner arrangements or individual pilot burners and the supply can be regulated via a plurality of distributors or regulating valves 71. A second medium M2, namely start-up gas, is fed via the second conduit system 2 to individual burner arrangements or individual clusters 11 or individual start-up burners and the supply can be regulated via distributors or regulating valves 72. A third medium M3, namely fuel gas, is fed via the third conduit system 3 to individual burner arrangements or individual main burners and the supply can be regulated via a plurality of distributors or regulating valves 73. A fourth medium M4, namely offgas/tailgas/purge gas, is supplied via a fourth conduit system 4 (dotted lines) to the respective burner arrangement or the respective cluster 11 and the supply can be regulated via a plurality of distributors or regulating valves 74.

The individual burners form burner clusters 11 comprising at least three types of burners, namely pilot burners, start-up burners and main burners, on the respective reformer tube 104.

The reference symbol 50 denotes a measuring device, in particular optical and/or acoustic, in particular comprising a flame monitoring unit. For example, the measuring device 50 can comprise both one or more flame monitors 51 for pilot burners and one or more flame monitors 52 for start-up burners.

Figure 2:
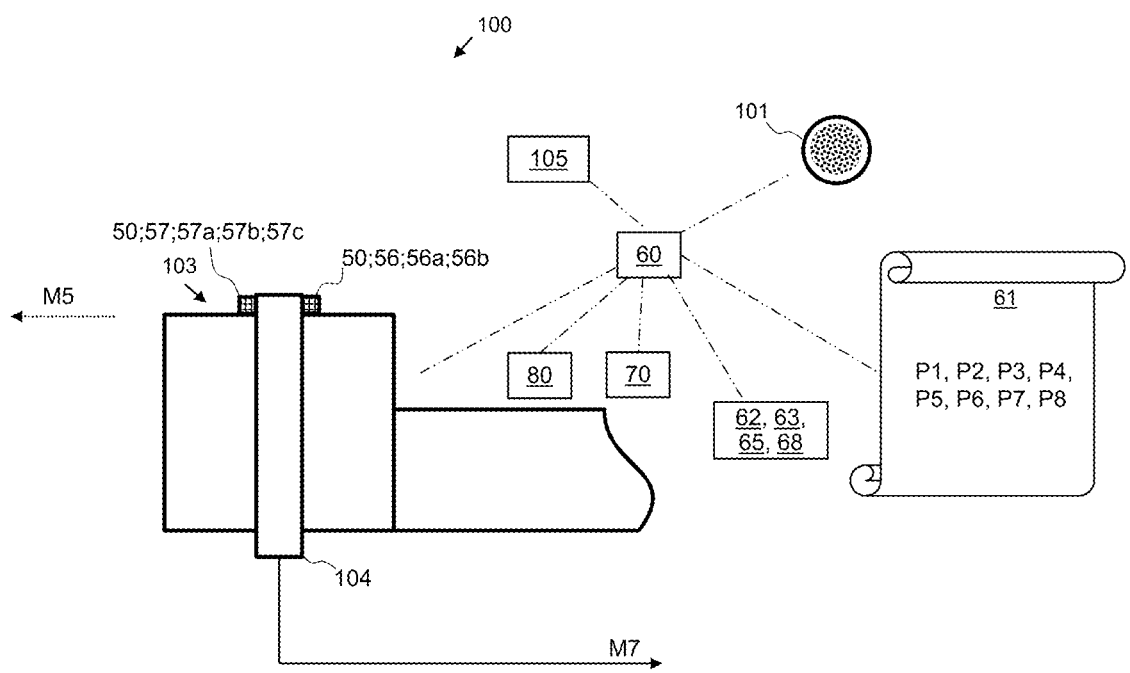
FIG. 2 is a schematic view of an example steam reformer arrangement.

FIG. 2 shows a steam reformer arrangement 100 comprising the regulating system described above in general terms.

The reference symbol 56 denotes a temperature measuring unit, in particular comprising a first temperature measuring unit 56a at the inlet of a high-temperature shift and a second temperature measuring unit 56b at the outlet of a reactor 103.

The reference symbol 57 denotes a pressure measuring unit, in particular comprising a pressure measuring unit 57a for process pressure and/or a pressure measuring unit 57b for export steam pressure and/or a pressure measuring unit 57c for PC vapor pressure.

A control/regulation device 60 makes recourse to a process databank 61 in which parameter data for various parameters P1, P2, P3, P4, P5, P6, P7, P8 can be stored. The control/regulation device 60 ensures a switching-on function 101: a standardized start-up process can be initiated by means of a switch 101 (keyword "ramp-up button") which is coupled to the control/regulation device. The switch 101 can here also be referred to by way of example as user interface.

In addition, the control/regulation device 60 communicates or is in communicative connection with individual flow regulators 62, 63, 65 for in each case at least one stream of medium and is also in communication with an outlet temperature regulation 66 (temperature regulating unit) and with a pressure regulation 67 (pressure regulating unit) and with an S/C regulation 68 for setting the steam-to-carbon ratio.

The reference symbol 70 denotes a flow regulating device, in particular comprising regulating valves for the streams of media M1, M2, M3, M4.

The reference symbol M5 denotes discharged flue gases.

A let-down device 80 can, depending on the particular configuration of the process, comprise a plurality of (automatic) let-down valves (not depicted) in relation to the individual components, in particular in relation to individual burners, steam drums, in desulfurization sections. Likewise, connecting conduits between components of the let-down device and individual distributors or regulating valves can be provided.

The reference symbol 105 indicates a bypass around the main steam regulating valve.

Figure 3:
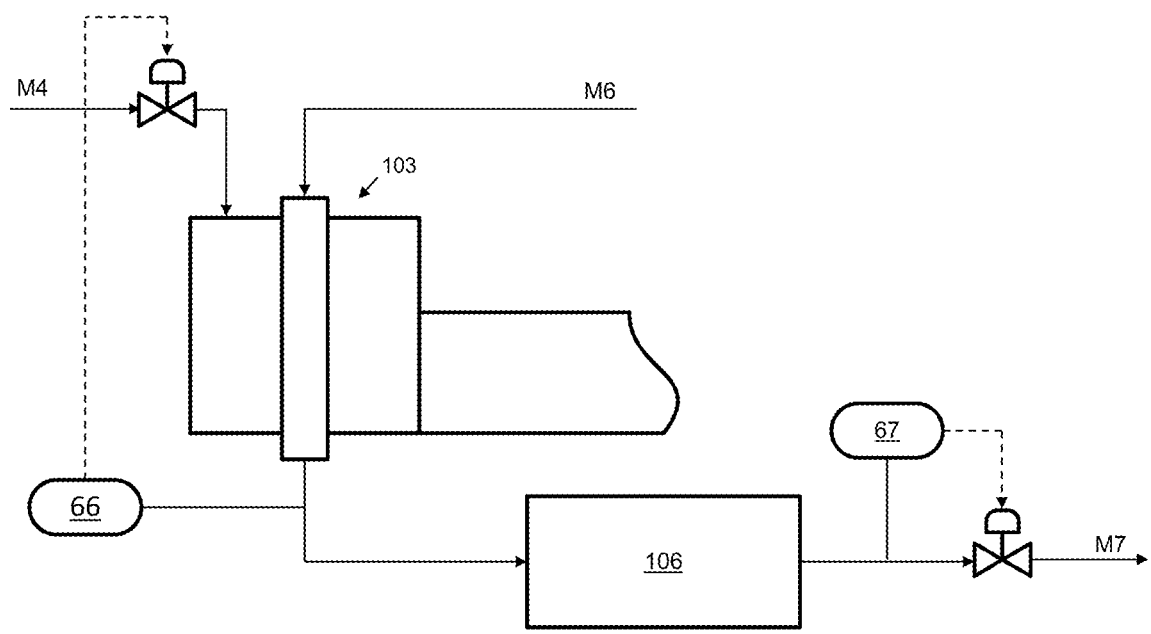
FIG. 3 is a schematic view depicting the regulation of circuits of a steam reformer arrangement.

FIG. 3 shows a steam reformer arrangement 100 comprising the regulating system which has been described above in general terms, with the steam reformer arrangement 100 also comprising a gas cooling or shift reaction or pressure swing adsorption (reference symbol 106), which can be provided, in particular, downstream of the reformer process, or being coupled thereto.

A respective temperature regulating unit 66 (in particular TIC Temperature Controller) is, in particular, configured for regulating the temperature at the reformer exit, in particular by addition of more or less make-up fuel.

A respective pressure regulating unit 67 (in particular PIC Pressure Controller) is, in particular, configured for regulating the pressure, in particular in the total back end of the hydrogen plant, in particular by opening/closing a hydrogen release valve.

The reference symbol M6 denotes feed gas.

The reference symbol M7 denotes a product stream, in particular hydrogen.

LIST OF REFERENCE SYMBOLS 1 first conduit system, in particular for a first group of burners
2 second conduit system, in particular for a second group of burners
3 third conduit system, in particular for a third group of burners
4 fourth conduit system, in particular for a fourth medium
10 a first group of burners, in particular burners of a first type, in particular pilot burners
11 burner cluster comprising at least three types of burners
20 second group of burners, in particular burners of a second type, in particular start-up burners
30 third group of burners, in particular burners of a third type, in particular non-start-up burners or main burners
50 measuring device, in particular flame monitoring unit, in particular optical and/or acoustic
51 flame monitor for pilot burners
52 flame monitor for start-up burners
56 temperature measuring unit
56a temperature measuring unit at inlet to high-temperature shift
56b temperature measuring unit at reactor outlet pressure measuring unit
57a pressuring measuring unit for process pressure
57b pressure measuring unit for export steam pressure
57c pressure measuring unit for PC vapor pressure
60 control/regulation device
61 process databank
62 flow regulator for start-up steam
63 flow regulator for a further medium
65 flow regulator for product, in particular for hydrogen
66 outlet temperature regulation or temperature regulating unit
67 pressure regulation or pressure regulating unit
68 S/C regulation (steam-to-carbon ratio)

70 flow regulating device
71 distributor or regulating valve for pilot gas
72 distributor or regulating valve for fuel gas for start-up burners
73 distributor or regulating valve for fuel gas for non-start-up burners
74 distributor or regulating valve for offgas and/or purge gas
80 let-down device
M1 first medium, in particular pilot gas
M2 second medium, in particular start-up gas
M3 third medium, in particular fuel gas or non-start-up gas
M4 fourth medium, in particular offgas/tailgas/purge gas
M5 fifth medium, in particular offgases/flue gases
M6 sixth medium, in particular feed gas
M7 seventh medium, in particular product (in particular hydrogen)
P1 first parameter, in particular flow of a first medium
P2 second parameter, in particular flow of a second medium
P3 third parameter, in particular flow of a third medium
P4 fourth parameter, in particular flow of a fourth medium
P5 fifth parameter, in particular temperature of offgases/flue gases or reactor outlet temperature
P6 sixth parameter, in particular inlet temperature
P7 seventh parameter, in particular pressure in the steam system
P8 eighth parameter, in particular pressure in the reactor
100 steam reformer arrangement
101 switching-on function or switch for start-up process ("ramp-up button")
103 reactor
104 reformer tube
105 bypass around main steam regulating valve
106 gas cooling or shift reaction or pressure swing adsorption

What is claimed is:

1. A method for starting a steam reformer arrangement up to a normal operating state, the steam reformer arrangement comprising a reactor comprising reformer tubes and a plurality of burners, the plurality of burners comprising a first group of pilot burners, a second group of startup burners, and third group of non-startup burners, the steam reformer arrangement configured for production of hydrogen, methanol, ammonia, or synthesis gas, the method comprising:
controlling and regulating burners that are coupled to a reactor comprising reformer tubes, wherein startup is performed and regulated in an automated manner by the non-startup burners that ensure normal operation, wherein the non-startup burners are ignited indirectly as a function of temperature by the pilot burners and the startup burners provided specifically for startup, as a function of at least one of automatically evaluated flame monitoring or temperature monitoring at least with respect to the pilot burners.

2. The method of claim 1 wherein at least one of:
the plurality of burners ensuring normal operation are ignited indirectly as a function of temperature by autoignition by the plurality of burners provided specifically for startup being ignited beforehand indirectly by the pilot burners; or
the startup is performed and regulated in an automated manner by a first group of burners being firstly ignited as the pilot burners in a first startup phase and a second group of burners then being ignited as the startup burners by the pilot burners, wherein the first and second groups of burners are operated such that a temperature in the reactor rises above an autoignition temperature and, after attainment of the autoignition temperature, the plurality of burners ensuring normal operation in a third group of burners are ignited as the non-startup burners and operated in a further startup phase.

3. The method of claim 1 wherein at least one of:
all of the pilot burners are firstly ignited, wherein a single first one of the startup burners is then ignited indirectly via a corresponding one of the pilot burners, wherein additionally of the startup burners are each ignited only after a minimum period of time, minutes later at earliest,
the startup burners are ignited sequentially after one another as a function of a temperature ramp in the reactor at a gradient of less than 100 K/h, or
the startup burners are ignited sequentially after one another until a predefinable reactor outlet temperature of at least 350° C. has been attained.

4. The method of claim 1 wherein at least one of:
the non-startup burners are ignited by autoignition in a further startup phase as a function of a minimum temperature threshold indirectly by introduction of fuel gas, gradually with a stepwise increase in the fuel gas throughput in each case after a period of time of at least minutes, based on flow regulation of the fuel gas, with regulatory matching to a pressure regulation as a function of an instantaneous reactor outlet temperature, or
at least three media streams are regulated for startup, depending on one another, comprising pilot gas for the pilot burners, fuel gas for the startup burners, and fuel gas for the non-startup burners, wherein the respective media stream is fed via a central distributor to the appropriate burners.

5. The method of claim 1 wherein at least one of:
a startup process is performed in at least three successive startup phases until the normal operating state has been attained or a product has been provided, or
a startup process is performed in three successive startup phases followed by an operating phase, including a first startup phase comprising ignition of both the pilot burners and the startup burners, a second startup phase comprising steam operation, and a third startup phase comprising ignition of the non-startup burners and introduction of feed gas, wherein production occurs in the operating phase, with the operating phase comprising at least one pressure swing sequence for startup of a pressure swing adsorption.

6. The method of claim 1 wherein at least one of:
temperature regulation is performed by at least a temperature in the reactor and/or at a reactor outlet;
a first temperature threshold in a range from 200° C. to 250° C. is measured in a flue gas or at a reactor outlet and when exceeded a temperature gradient of not more than not more than 50 K/h is set by sequential ignition of further startup burners;
a further temperature threshold in a region of 200° C. is measured in a flue gas or at a reactor outlet, on which steam valves are closed;
a further temperature threshold in a region of 350° C. is measured in a flue gas or at a reactor outlet up to which sequential ignition of further startup burners is continued;
a further temperature threshold of at least 250° C. is measured in a flue gas or at a reactor outlet and when exceeded a pressure regulation in the reactor and/or in a steam system is activated by increasing a pressure to at least 20 bara and/or by setting a pressure gradient of 0.5 bar/min in a first and/or second startup phase;

a further temperature threshold of at least 350° C. is measured in a flue gas or at a reactor outlet and/or a further temperature threshold of at least 180° C. of a high-temperature shift or CO conversion reactor is measured and in each case when exceeded a second start-up phase is initiated by introduction of steam into the reactor;

a further temperature threshold of 500° C. is measured and when exceeded a pressure regulation in the reactor for setting an operating pressure is activated by setting a pressure gradient in a range from 0.5 bar/min to 1 bar/min;

a pressure regulation in the reactor for setting an operating pressure is activated at a temperature threshold lower than a further temperature threshold for ignition of the non-startup burners by setting a pressure gradient in a range from 0.5 bar/min to 1 bar/min;

a further maximum temperature threshold of 700° C. is measured in a flue gas or at a reactor outlet, up to which ignition of the startup burners is continued and when exceeded a third, startup phase is initiated by ignition of the non-startup burners;

a further maximum temperature threshold in a range from 850° C. to 1050° C. is measured in a flue gas or at a reactor outlet, up to which feed gas is introduced with a throughput/flow that increases with time;

a time-based temperature gradient of not more than 50 K/h temperature rise is set in a respective phase; or a respective startup phase is initiated as a function of minimum temperature thresholds.

7. The method of claim 1 wherein at least one of:
a pressure regulation in a steam system is performed as a function of a reactor outlet temperature;
a pressure in a first startup phase is increased to at least 20 bara;
a rising pressure gradient in a range from 0.5 bar/min to 1 bar/min is set in a first and/or a second startup phase;
a rising pressure gradient of 10 bar/h is set in a steam system in a third startup phase; or
a load or a flow of a medium of not more than 40% of a maximum output or of a maximum plant load is set in a respective startup phase by regulating flow of steam and/or feed gas.

8. The method of claim 1 wherein at least one of:
at least one entry boundary condition from the following group is ensured for startup: nitrogen flushing completed, automatic pressure regulation of a reactor switched on, or reactor outlet temperature actively regulated as a function of pressure and throughput of fuel gas;
at least one of the following parameters is monitored during startup: throughput of a medium supplying the non-startup burners, flame characteristics of a respective pilot burner, or flame characteristics of a respective startup burner; or
at least one regulating loop in respect of at least one parameter from the following group is performed during startup: steam/carbon ratio, reactor outlet temperature, reactor pressure, throughput of medium, steam pressure, or process condensate vapor pressure.

9. The method of claim 1 comprising an at least partially automated running-down of the steam reformer arrangement from the normal operating state in a reverse order of steps compared to startup.

10. A control/regulation device configured to perform the method of claim 1, wherein the control/regulation device is coupled to at least three groups of burners comprising the pilot burners, the startup burners, and the non-startup burners, wherein the control/regulation device is coupled to at least three distributors for at least three streams of media comprising a media pilot gas, a fuel gas for the startup burners, a fuel gas for the non-startup burners, wherein the control/regulation device is configured for regulating the at least three streams of media in time dependence on one another and/or as a function of temperature.

11. A steam reformer arrangement for production of hydrogen, methanol, ammonia, or synthesis gas, wherein the steam reformer arrangement is configured for regulated startup of production and for automated startup of production, the steam reformer arrangement comprising burners coupled to a reactor comprising reformer tubes, the burners comprising:
non-startup burners provided for normal operation, and
burners provided specifically for startup, including pilot burners and startup burners, wherein the burners provided specifically for startup are configured for indirect temperature-dependent ignition of the non-startup burners provided for normal operation, in an automated manner as a function of signals from a flame monitoring unit and/or at least one temperature measurement unit.

12. The steam reformer arrangement of claim 11 wherein at least one of:
the steam reformer arrangement is configured for a three-stage ignition sequence comprising two ignitions before a final ignition of a respective main burner; or
the steam reformer arrangement comprises a first group of burners including the pilot burners and a further group of burners including the startup burners, wherein the steam reformer arrangement is configured to provide an autoignition temperature in the reactor by way of the groups of burners so that another group including the non-startup burners can be ignited indirectly after attainment of the autoignition temperature indirectly exclusively by introduction of fuel gas.

13. The steam reformer arrangement of claim 11 wherein at least one of:
different groups of the burners are distributed spatially in clusters and in the clusters are arranged relative to one another at least one pilot burner relative to at least one startup burner in a respective cluster;
a pilot burner is assigned to each startup burner in a pairwise cluster arrangement;
or
the non-startup burners are arranged spatially separately from the startup burners.

14. The steam reformer arrangement of claim 11 wherein the burners are arranged in two different types of clusters, including in a plurality of first clusters comprising at least some of the pilot burners and some of the start-up burners and a plurality of second clusters comprising at least some of the non-startup burners, wherein at least three conduits comprising at least one startup fuel gas conduit and at least one pilot gas conduit and at least one offgas conduit lead to each of the first clusters and at least two conduits comprising at least one non-startup fuel gas conduit and at least one offgas conduit lead to each of the second clusters.

15. The steam reformer arrangement of claim 11 wherein at least one of:
individual non-startup burners can be ignited individually or together as a complete group by autoignition indirectly exclusively by introduction of fuel gas;
the steam reformer arrangement has at least one flow regulator for the non-startup burners individually or together configured for regulation in steps of in each case from 0.5% to 5% of a normal operation throughput;

the steam reformer arrangement comprises a distributor for a respective startup burner;

the steam reformer arrangement comprises a distributor for a respective non-startup burner; or the steam reformer arrangement comprises a flow regulating valve for a respective non-startup burner.

16. The steam reformer arrangement of claim 11 wherein at least one of:

the steam reformer arrangement comprises at least one flow regulating valve for startup steam, which is able to be regulated for flows in a range from 5% to 40% and more of 100% flow for normal operation, which is able to be regulated with a step accuracy of at least 0.5% of flow for normal operation;

the steam reformer arrangement comprises at least one temperature measuring unit at an inlet to a high-temperature shift or a CO conversion reactor and a temperature measuring unit at a reactor outlet; or the steam reformer arrangement comprises at least one pressure measuring unit for a process pressure in the reactor, a pressure measuring unit for a steam pressure, a pressure measuring unit for an export steam pressure, and/or a pressure measuring unit for a PC vapor pressure.

17. The steam reformer arrangement of claim 11 comprising flame monitors for the pilot burners and/or for the startup burners.

18. A computer program product configured to perform the method of claim 1, wherein the method is performed on a computer, wherein a control/regulation sequence both for controlling the non-startup burners provided for normal operation and the burners provided specifically for startup is ensured by the computer program product.

19. The computer program product of claim 18 wherein a temperature-dependent and/or pressure-dependent prescribed time for ignition of individual burners among the burners can be prescribed by the computer program product as a function of an instantaneous temperature gradient.

* * * * *